US011599469B1

(12) United States Patent
Hamelin et al.

(10) Patent No.: US 11,599,469 B1
(45) Date of Patent: Mar. 7, 2023

(54) SYSTEM AND METHODS FOR CACHE COHERENT SYSTEM USING OWNERSHIP-BASED SCHEME

(71) Applicant: HUAWEI TECHNOLOGIES CO., LTD., Shenzhen (CN)

(72) Inventors: Louis-Philippe Hamelin, Montreal (CA); Chang Hoon Lee, Montreal (CA); John Edward Vincent, Ottawa (CA); Olivier D'Arcy, Longueuil (CA); Guy-Armand Kamendje Tchokobou, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/571,004

(22) Filed: Jan. 7, 2022

(51) Int. Cl.
  *G06F 12/00* (2006.01)
  *G06F 12/084* (2016.01)
  *G06F 12/0817* (2016.01)

(52) U.S. Cl.
  CPC ........ *G06F 12/084* (2013.01); *G06F 12/0828* (2013.01); *G06F 2212/621* (2013.01); *G06F 2212/622* (2013.01)

(58) Field of Classification Search
  CPC ............... G06F 12/084; G06F 12/0828; G06F 2212/621; G06F 2212/622
  See application file for complete search history.

(56) References Cited

U.S. PATENT DOCUMENTS

| 2002/0010836 A1* | 1/2002 | Barroso | G06F 12/0826 711/E12.024 |
| 2005/0154840 A1* | 7/2005 | Greer | G06F 12/0822 711/E12.028 |

FOREIGN PATENT DOCUMENTS

EP  3260986 A1 * 12/2017 .......... G06F 12/0811

\* cited by examiner

*Primary Examiner* — Arvind Talukdar

(57) ABSTRACT

A computer system includes a first core including a first local cache and a second core including a second local cache. The first core and the second core are coupled through a remote link. A shared cache coupled to the first core and to the second core. The shared cache includes an ownership table that includes a plurality of entries indicating if a cache line is stored solely in the first local cache or solely in the second local cache. The remote link includes a first link between the first core and the shared cache and a second link between the second core and the shared cache.

15 Claims, 12 Drawing Sheets

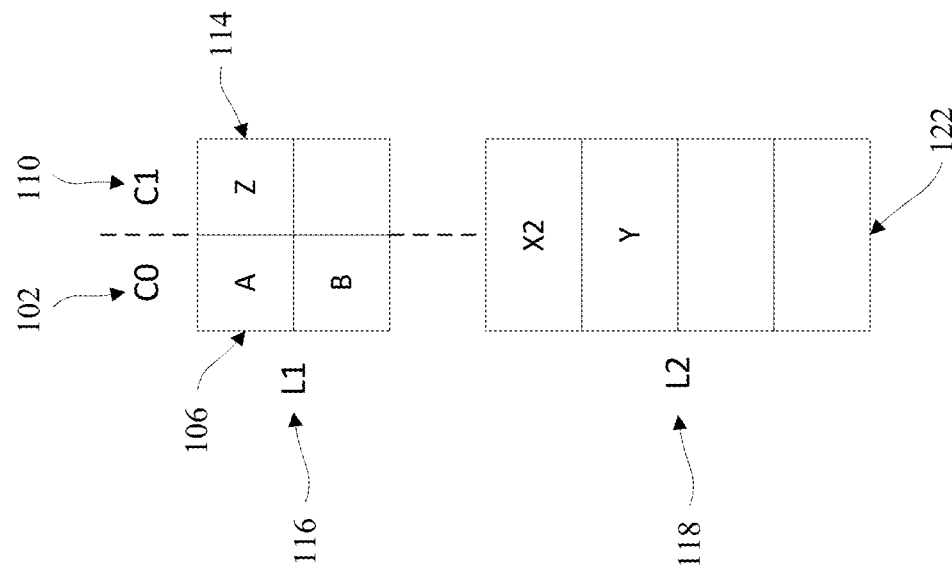

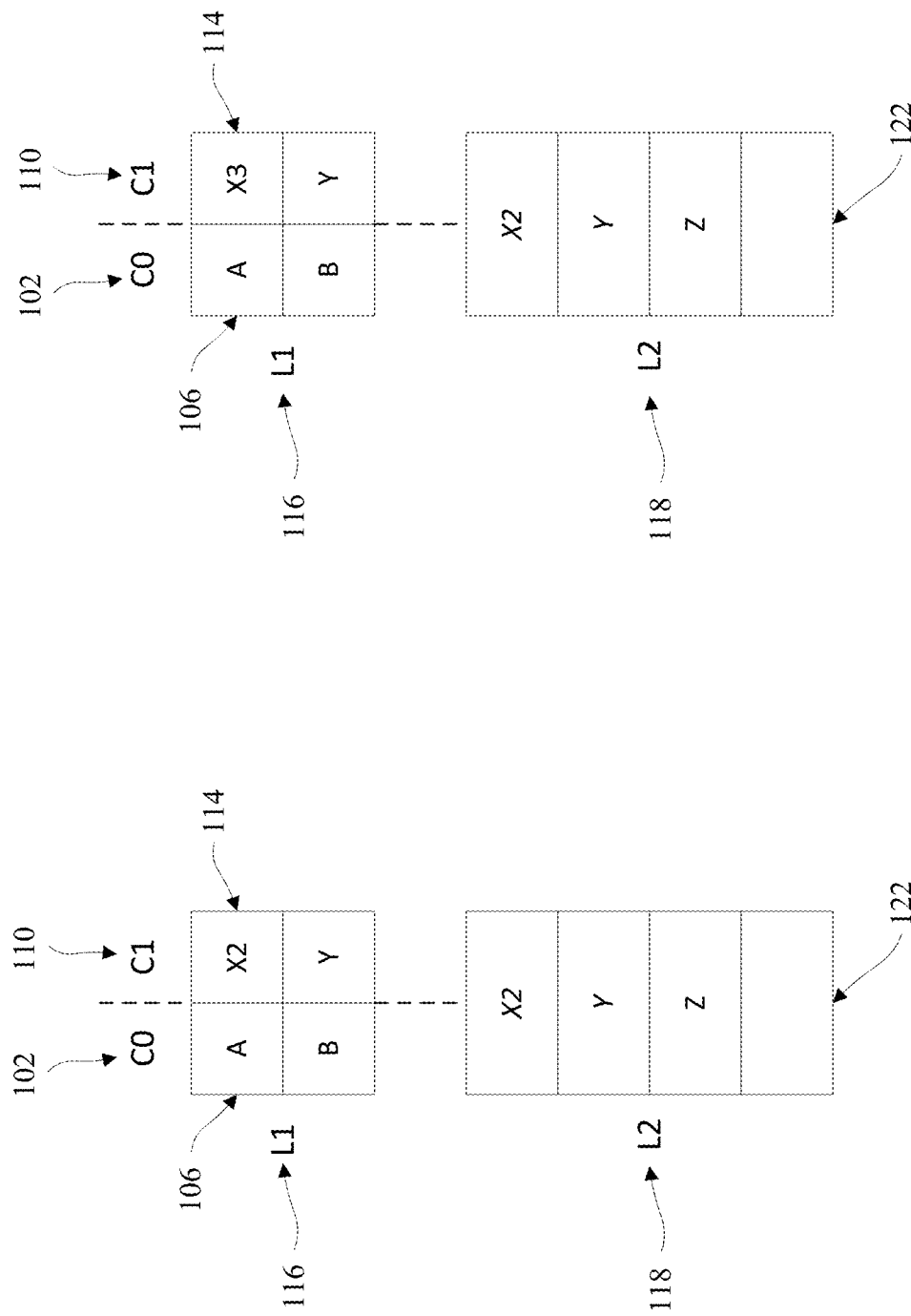

SYSTEM AND METHODS FOR CACHE COHERENT SYSTEM USING OWNERSHIP-BASED SCHEME

CROSS-REFERENCE TO RELATED APPLICATIONS

This is the first application filed for the present invention.

TECHNICAL FIELD

The present invention pertains to the field of multi-core computer architecture, and in particular to methods and systems for facilitating cache coherency among multiple cores and multiple layers of caches.

BACKGROUND

In today's System-on-Chip (SoC) design, power and data memory access have become critical metrics. In multi-core systems where each core has its own cache, but data is shared among all cores, there is a need to keep the caches coherent. In such systems, multiple copies of the same cache line are often present in more than one local, private cache. When a cache line copy is modified locally, the update must also be applied to all other existing copies of the same cache line. Otherwise, data coherency issues arise. Snoop-based or directory-based cache coherence protocols are the most commonly used protocols to maintain cache coherency.

Snoop-based cache coherence is one approach to the cache coherency problem. This technique allows cores to observe, through a shared bus, the reads and writes of other cores in the system. However, snoop-based cache coherence systems can negatively impact the performance of the system. For example, before writing a block of data (even if the block of data is already available in a core's private cache), a core must broadcast the write information to all other cores to maintain coherence. However, the overhead of the snoop-based protocol increases traffic on the bus, increases power consumption and lowers the overall system performance.

Directory-based cache coherence is another approach to maintain cache coherency while attempting to address performance and scalability issues of snoop-based systems. Directory-based systems exist under multiple variations and protocols to monitor the shared data between local private caches. While a common centralized directory avoids race conditions between core requests, it quickly becomes a performance bottleneck for servicing all the requests. Distributed directories provide faster local access to each core but require more complex protocols and communications for synchronization and update.

A private cache provides fast and deterministic access to its dedicated core. However, private caches require coherency protocols because of cache lines duplications. A shared cache, accessed by many cores, naturally maintains coherency by preventing line duplicates. However, cores suffer from slower accesses and consume more power because of longer distance between cores and centralized memory. Coherency may still be required between multiple shared caches.

Each SoC design tends to have its own cache flavor, optimized for specific applications. A multi-core system without cache memory could potentially exist, but its performance would likely be poor. Systems can also rely on software coherency, but an unacceptable number of CPU cycles are required to handle coherency.

In summary, a multi-layered cache approach is used by most modern multi-core systems and cache coherence management is important when multiple copies of same data could exist in different cache entities of the system. However, coherence management overhead is non-negligible, consumes significant power and resources and slows down the memory accesses.

Therefore, there exists a need to provide an improved cache coherency scheme to support multiple cores and multiple cache layers that obviates or mitigates one or more deficiencies of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and systems to reduce cache coherence overhead and power while maintaining adequately high performance of a multi-core system. Embodiments mitigate or eliminate the need for complex cache coherence management systems by combining the advantages of shared (simple coherence management) and private (fast memory access) layer 1 (L1) cache banks. Using simple ownership tables and dedicated remote interfaces, the cache coherent architecture is scalable to a large number of cores in the system.

Embodiments may limit or minimize cache coherence management overhead as ownership table content is filled by the cache controller of the next higher layer of the cache hierarchy by extracting information from a core's access request following an L1 cache miss. In some embodiments, little or no additional communications are required between the core and the cache controller of the next higher layer of the cache hierarchy to populate the ownership table content. Embodiments significantly reduce the latency of access to cache lines shared between cores since line duplicates are avoided and ownership tables quickly locate any cache lines available in the L1 cache banks of cores. Since cache lines are not duplicates, storage efficiencies of the overall cache memory is improved.

In accordance with embodiments of the present invention, there is provided an apparatus including a first core including a first local cache and a second core including a second local cache. The first core and the second core are coupled through a remote link. A shared cache is coupled to the first core and to the second core. A cache controller of the shared cache includes a first ownership table memory of the first core and a second ownership table memory of the second core. The first ownership table memory and the second ownership table memory include a plurality of entries indicating if a cache line is owned solely by the first core or if the cache line is owned solely by the second core.t the next higher In further embodiments, the remote link includes a first link between the first core and the cache controller and a second link between the second core and the cache controller of the shared cache.

In embodiments, the shared cache further comprises tag lookup memory of the shared cache, the first local cache includes tag lookup memory for the first local cache, and the second local cache includes tag lookup memory for the second local cache.

In further embodiments, the cache controller is configured to receive, from the first core, a request for the cache line and search the second OTM for an owner of the cache line. Also, to retrieve the cache line from a location indicated by the second OTM, and send the cache line to the first core.

In further embodiments, wherein the cache controller is further configured to search a tag lookup memory for a status of the cache line in the shared cache.

In further embodiments, wherein the search of the second OTM indicates that the cache line is not cached, and the cache line is located in a main memory, the cache controller being further configured to update the first OTM to indicate that the first core is the owner of the cache line In further embodiments, the search of the second OTM indicates that the cache line is cached in the second core, the owner of the cache line is the second core, and the cache line is located in the second local cache of the second core, the cache controller being further configured to receive the cache line from the second core.

In further embodiments, the search of the second OTM indicates that the cache line is cached in the shared cache, and the location is the shared cache, the cache controller being further configured to update the first OTM to indicate that the first core is the owner of the cache line.

In accordance with embodiments of the present invention, there is provided a method for accessing data in a remote cache of a computer system, by a cache controller of a shared cache. The method includes receiving, from a first core, a request for a cache line. Then searching ownership table memory (OTM) for an owner of the cache line, where the owner is one of a plurality of cores of the computer system. Also, retrieving the cache line from a location indicated by the OTM, and sending the cache line to the first core.

Embodiments further include searching a tag lookup memory for a status of the cache line in the shared cache.

In further embodiments, the search of the OTM indicates that the cache line is not cached, and the cache line is located in a main memory. The method further includes updating the OTM to indicate that the first core is the owner of the cache line.

In further embodiments, the search of the OTM indicates that the cache line is cached in a second core, the owner of the cache line is the second core, and the cache line is located in a private cache of the second core. The method further includes the cache controller receiving the cache line from the second core.

In further embodiments, the search of the OTM indicates that the cache line is cached in a shared cache at a same cache layer as the cache controller, and the location is the shared cache. The method further includes updating the OTM to indicate that the first core is the owner of the cache line.

In further embodiments, the first core includes a first local cache, a second core includes a second local cache, the first core and the second core are coupled through a remote link, and the shared cache is coupled to the first core and to the second core, the cache controller of the shared cache includes a first OTM of the first core and a second OTM of the second core, the first OTM and the second OTM including a plurality of entries indicating if the cache line is owned solely by the first core or if the cache line is owned solely by the second core.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIGS. 8A through 8I illustrate the operations of a cache hierarchy over the course a number of operations, according to an embodiment.

It will be noted that throughout the appended drawings, like features are identified by like reference numerals.

DETAILED DESCRIPTION

Embodiments of the present disclosure relate to methods and systems that reduce cache coherence overhead and power consumption while maintaining adequately high performance of a multi-core system. Embodiments mitigate or eliminate the need for complex cache coherence management systems by combining the advantages of shared (simple coherence management) and private (fast memory access) layer 1 (L1) cache banks. Using small ownership tables and point-to-point remote interfaces, the cache coherent architecture of embodiments are scalable for a large number of cores in the system. Though the terms "core" and "multi-core" used herein, in the art the terms "processor" and "multiprocessor" are also commonly used.

Embodiments limit or minimize cache coherence management overhead as ownership table content is filled at the next higher layer of the cache hierarchy by extracting information from a core's access request following a cache miss. For example, in a 2-layer hierarchy, ownership tables for each L1 cache may be maintained at the L2 layer. In a 3-layer hierarchy with more than one L2 cache instance, ownership tables for each L2 cache may be maintained at the L3 layer to track the cache lines currently owned by the L2 and all L1 caches. No additional communications are necessarily required between the core and the cache controller of the next higher layer of the cache hierarchy to populate the ownership table content. Embodiments can significantly reduce the latency of access to cache lines shared between cores since line duplicates are avoided and ownership table quickly locate any cache lines available in the L1 cache banks of cores. Since cache lines are not duplicates, storage efficiencies of the overall cache memory are improved.

Embodiments implement an ownership-based cache coherency scheme. Coherency is maintained with cache lines having a single core which is the owner of that cache line. If a cache line is owned by a core, other cores that access that line must do so using read or write requests that are exchanged between cores using a remote interface. To implement the cache coherency scheme, higher-layer caches track the owners of lower-layer cache lines.

Figure 1:
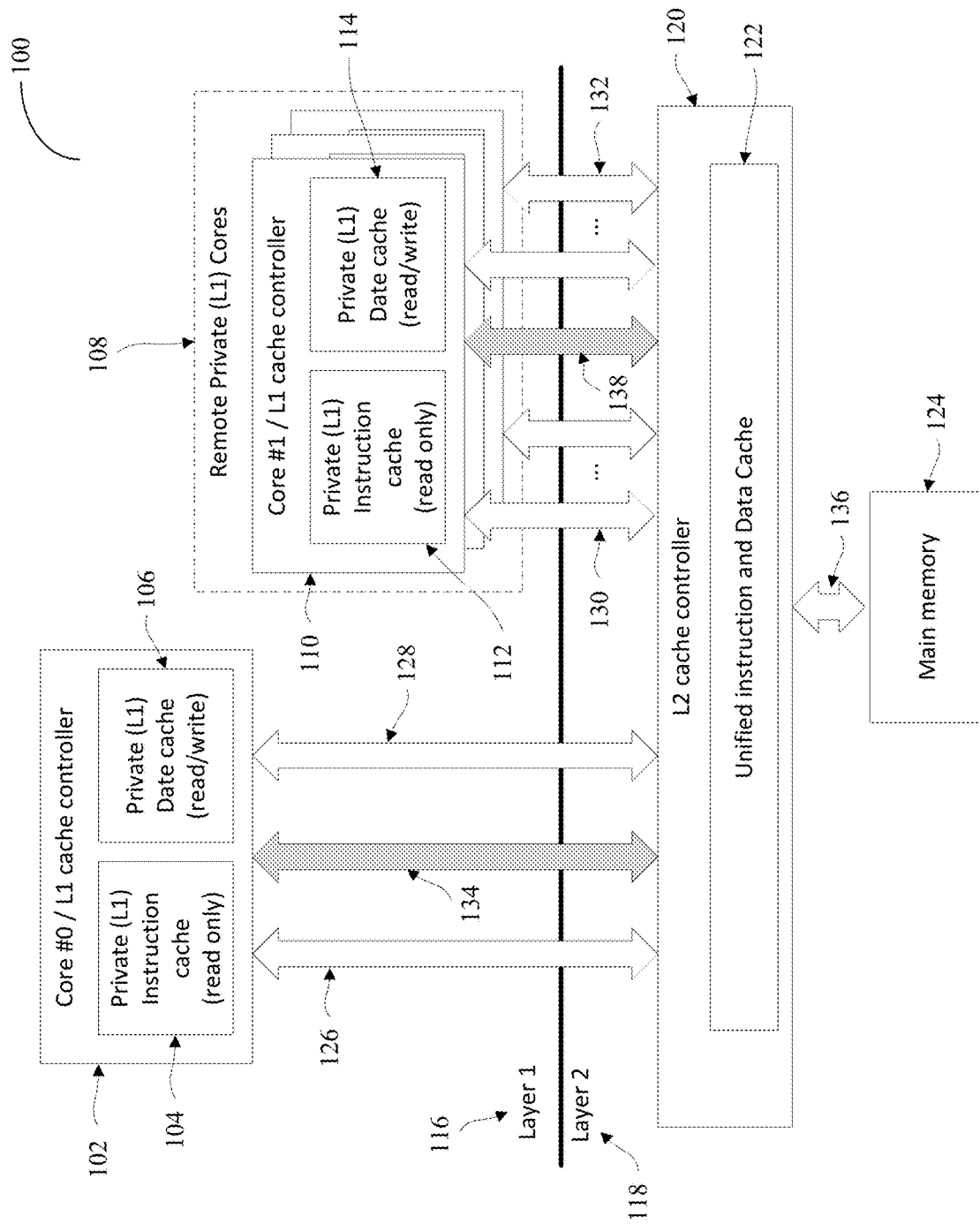
FIG. 1 illustrates an overview of a 2-layer caching system, according to an embodiment.

With reference to FIG. 1, embodiments are described with reference to a multi-core computing device 100 with a two-layer cache architecture, which includes cache layer 1 116 and cache layer 2 118. Computer system 100 includes a core #0 102 and one or more remote cores 108, that including core #1 110. Core #0 102 and remote cores 108 are at the same level of the cache hierarchy, however from the point of view of core #0 102, the other cores 108 may be viewed as being remote. If a cache line is owned by a core, for example, core #1 110, then from core #0's 102 point of view, the cache line is held in a remote L1 cache, and a remote interface must be used to access the cache line. Each core in the computer system 100 may be identical or different, however each core may include a dedicated private layer 1 (L1) instruction cache 104 & 112, which may be read-only, and a dedicated private layer 1 (L1) read/write data cache 106 & 114, which supports both read and write accesses. Each core considers the private read/write data cache of other cores as remote. For example, the L1 data cache of core #1 114 is considered remote by core #0 102. The L1 read/write cache of core #0 106 is considered remote by core #1 110. In embodiments, the L1 cache specifications may be 32 Kbytes, 512-bit cache lines with 4-way associativity, however, the size, associativity, and other parameters of each core may be different without deviating from the teachings herein.

In embodiments, a cache or a cache line may be accesses in a read/write or read-only manner. A read/write cache or cache line may be read and may also be written (modified). Typically, a data cache is a read/write cache since a core may read data, modify it, and write the new data value back to the cache. Though a data cache or data cache line may be read-only, this is rare. As used herein, "read/write" and "data" may be used interchangeably to describe a read/write cache in which read/write cache lines are stored.

Similarly, read-only cache or cache line may only be read and may not be written or modified. Typically, an instruction cache is a read-only cache since a core will read program instructions, but not modify them. An instruction cache may be read-only and a cache line may be cached in multiple read-only caches simultaneously, even in caches at the same or different cache layers, without the use of methods described herein. In other embodiments, an instruction cache may be read/write or may include read/write lines in which case methods described herein may be used to implement cache coherency. As used herein, "read-only" and "instruction" may be used interchangeably to describe a read-only cache in which read-only cache lines are stored.

Read-only caches such as L1 instruction caches 104 and 112 allow a cache line to be simultaneously stored and read from multiple caches and main memory 124 without coherence issues, because the cached read-only data is never modified. Instruction caches may be used by multiple cores to execute the same program from their "copy" stored in their instruction caches 104 and 112. If a line of the program is ever modified, then the core may need to clean its cache by evicting all valid cache lines from the L1 cache and write back the modified content to the L2 cache and possibly to main memory as well. Once modified data is written back, the cache line containing the modified instructions may be reloaded with the updated instruction or instructions.

The layer 2 (L2) unified instruction and data cache 122 is shared between the cores 102 and 108 of the computer system 100. In the embodiment of FIG. 1, this shared L2 cache 122 is also the last layer of cache of the two-layer cache architecture illustrated, attached to main memory 124 of the caching hierarchy. The L2 cache controller 120 manages the shared L2 cache 122 and interface to the main memory 124 through memory bus 136. The L2 cache controller 120 includes two distinct connections to each core. The first bus 126 and 130 is used by each core to forward a L1 cache miss request to the next cache layer and receive the new cache line response. The second bus 128 and 132 is used by the L2 cache controller to remotely access a read or write cache line located in one of the private L1 read/write caches 106 and 114 in the cores 102 and 108.

Embodiments include a remote interface 134 connecting the L1 cache controllers of the cores of the system to the L2 cache controller to avoid cache line duplicates between the L1 private read/write caches, or any other read/write cache memories within the computer system 100. Interface 134 may be used by the higher level, L2 cache controller to send cache coherence protocol requests to lower level, L1 cache controllers. Then interface 134 may be used to carry responses to the cache coherence protocol request that are returned from the L1 cache controllers to the L2 cache controllers. Interface 134 between each core and the L2 cache controller 120 of the computer system may include point-to-point connections between the L1 cores and L2 cache controller. Alternatively, a mesh network between cores may also be implemented.

Figure 2:
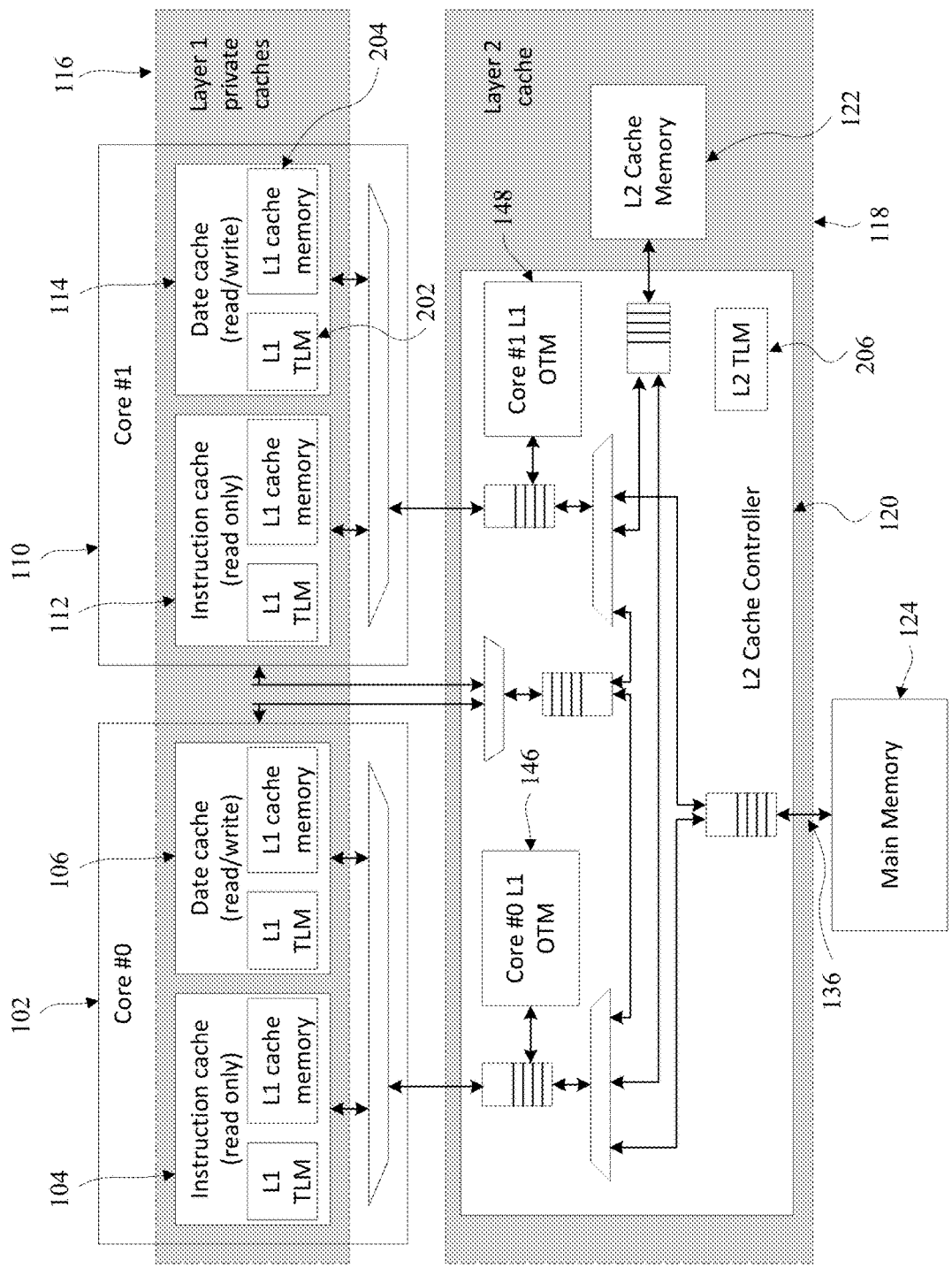
FIG. 2 illustrates a block diagram of a computing cluster including two cores and a two layer cache hierarchy, according to an embodiment.

FIG. 2 illustrates a block diagram of a computing cluster including two cores and a two-layer cache hierarchy, according to an embodiment. As used herein, a cache includes a combination of electronic hardware, firmware, software, or any combination of these elements and includes a cache controller, tag memory, and cache memory. Generally speaking, the cache controller controls the operation of the cache and its components, the tag memory tracks the status of data stored in the cache memory, and the cache memory is used for the actual storage of cache lines. Core #0 102 and core #1 110 both track the cache lines available in their respective private, L1 caches using conventional Tag Lookup Memory (TLM) 202. The L2 cache controller 120 manages the content of the shared L2 cache 122 by tracking loaded cache lines using an L2 TLM 206. In addition to the L2 TLM 206, the L2 cache controller 120 has per-core L1 Ownership Table Memory (OTM) 146 and 148 which acts as an ownership table to track the contents of the private read/write caches of the system cores. The content of the OTMs 146 and 148, which is maintained by the L2 cache controller 120, may be similar to the content of the TLMs of each core's private L1 caches without the cache line "dirty" status. In embodiments OTM 146 contains cache line ownership information for the L1 data cache 106 of core #0 102. OTM 148 contains cache line ownership information for L1 data cache 114 of core #1 110. In embodiments, each core serviced by an L2 cache 118 will have an associated OTM in the L2 cache controller 120.

In some embodiments, a computing system may be viewed as a cluster of a larger computer system using a multi-cluster architecture, such as a network on chip (NoC) architecture. For example, FIG. 2 may illustrate part or all of a cluster in a larger, multi-cluster computing system. A multi-cluster system may include additional interfaces, host port interfaces and may use cache coherent device memory (CDM) and NoC interfaces to implement caching between clusters and to move data structures between cores in different clusters.

Figure 3:
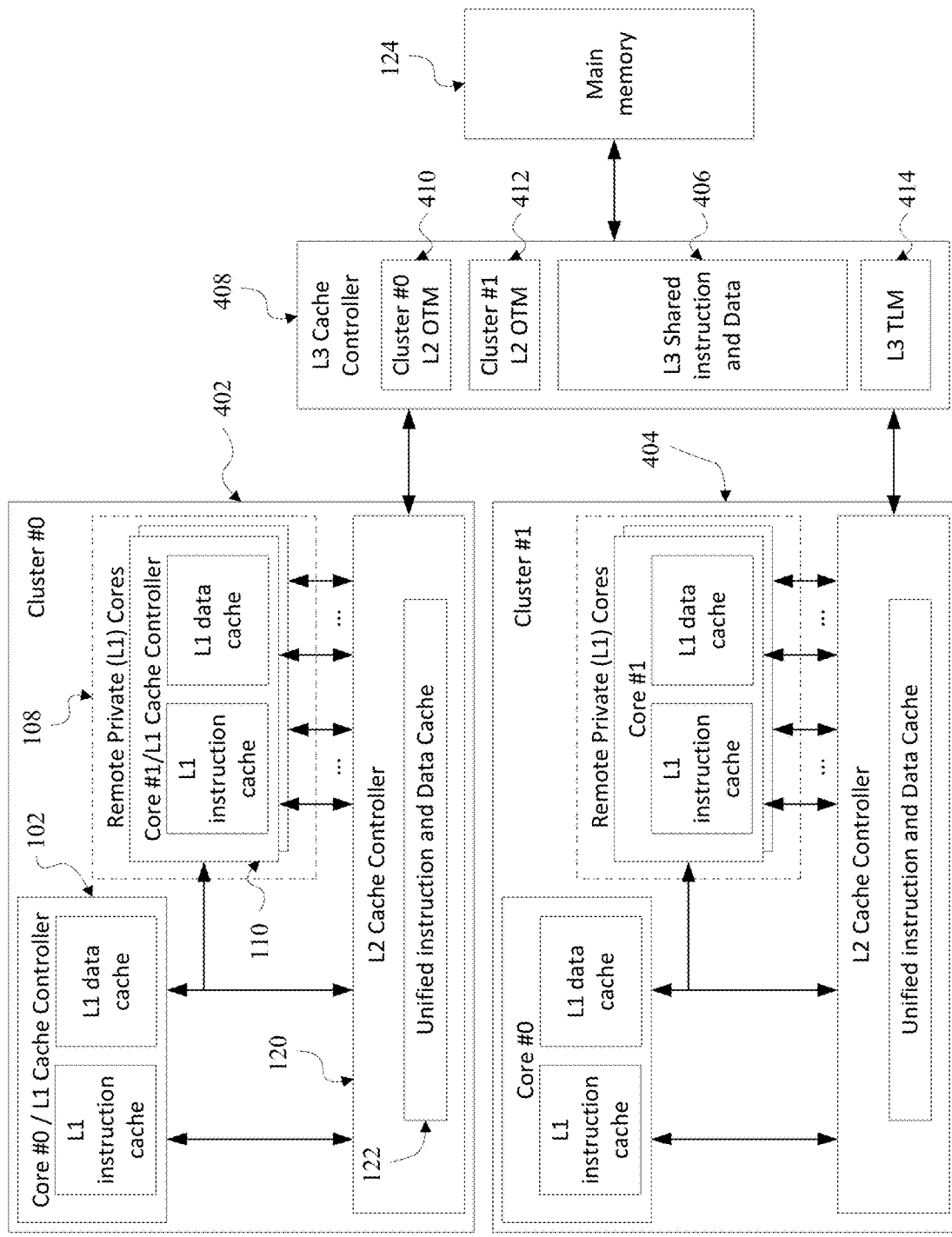
FIG. 3 includes a block diagram of a computing cluster with a 3-layer cache hierarchy, according to an embodiment.

Embodiments of an ownership-based cache coherency protocols will be illustrated with reference to FIG. 2 and FIG. 3. Using this protocol, a cache line that can be modified (a read/write cache line) may only be stored in one private L1 cache of a core or in the shared L2 cache at a time, as well as in main memory 124. At system start up, cache lines have no owner. When a read/write cache line is accessed by a core, it is loaded into the private L1 of the core. That core becomes the owner of the read/write cache line and remains the owner until the cache line is evicted or otherwise removed from that core or marked invalid. Eviction of a cache line from a cache may happen when all the cache's ways are used for a given cache set and a way must be free to store the new line. In this case, the L1 cache controller selects one of the valid lines in all of the ways and evicts it. Also, if the cache is cleaned (for example, by a fence instruction), all or some cache lines may be evicted from the L1 cache. If another core needs to access the same cache line it must access it remotely and is prevented from caching the line in its own cache. Since only one core at a time may be the owner of a read-write cache line, that core may freely modify (write) the data in the cache line without having to enforce cache coherency among multiple copies of the line.

In general terms, on a L1 cache miss indicating that the read/write cache line does not exist in a core's (for example, core #0 102) private L1 cache 106, the shared L2 cache controller 120 queries the L2 TLM 206 and the L1 ownership tables of cores other than the core that experiences the cache miss 148 simultaneously. The possible outcomes are:
 a. If a L2 cache hit is detected, the cache line is moved from L2 cache 122 to L1 cache 106 and core #0 102 becomes the cache line owner. Core #0 102 remains owner of the cache line until its eviction from L1 cache 106.
 b. If a remote L1 cache hit is detected (i.e., the cache line is already owned by another core #110), the cache line is either fetched (on a read request) or updated (on a write request) without changing its ownership. Core #0 102 receives the cache line content with read-only status. Subsequent accesses from core #0 102 to the same cache line will follow the same protocol and the cache line is not cached in private read/write cache 106 while the cache line is owned by core #1 110.
 c. On a global cache miss (i.e., the read/write cache line does not exist in any of the caches, only in main memory 124), the L2 cache controller 120 fetches the cache line from the main memory 124 and returns the cache line to the requesting core #0 102. Core #0 102 becomes the new owner of the read/write cache line.

In embodiments, a read/write cache line can only be found in a unique location at any given time. Simultaneous L2 cache and remote L1 cache hits are inhibited by the cache line handling rules in such embodiments.

On a L1 cache line eviction, the core owning the cache line removes the line from its L1 cache while the cache controller 120 adds it in the shared L2 cache 122.

On a L2 cache hit or global cache miss, the requesting core becomes the cache line owner. When the cache controller 120 sends the response back to the requesting core, the cache controller 120 records the cache line address in the ownership table of the requesting core, as owned by the core. If the cache line is later evicted from the L1 cache of the owning core and is added to the L2 cache 122, the cache controller 120 deletes the cache line from the ownership table of the core 146 or 148.

Embodiments can scale to a substantially arbitrary number of cache layers. Using a two-layer cache multi-core cluster, such as cluster #0 402 or cluster #1 404, as a new building block, a layer 3 (L3) cache controller 408 can be added to support multiple cache clusters. The new third layer monitors the cache lines owned by each cluster, analogously to the current L2 cache controller tracking the ownership of the cache lines owned by each core. Multi-core clusters 402 and 404 both contain two-layer cache hierarchies of L1 caches in cores such as 102 and 110 and a L2 shared cache 122 with its L2 cache controller 120 as described above. The two clusters 402 and 404 are then connected to an L3 cache 406, shared by all the clusters in the system. The shared L3 cache 406 is managed by the L3 cache controller 408 with the use of L3 TLM 414 to track the status of cache lines stores in L3 cache 406. OTM 410 and OTM 412 may be used to track ownership of cache lines in cluster #0 402 and in cluster #1 404 using similar protocols as used for the core #0 OTM 146 and the core #1 OTM 148. The L3 cache controller 408 is the last layer of cache of the system of FIG. 3 and includes an interface to main memory 124.

As for other cache systems, embodiments of this cache coherence architecture may still utilize synchronization mechanisms between cores when accessing shared data block. Examples include mutex, semaphores, and atomic operations.

Having reference to FIG. 1, embodiments include a remote interconnection bus 134 and interface on L1 cache memory to allow a core #102 in the system to read or write a cache line owned by another core #110 and stored in that core's L1 cache 114. Embodiments also include a point-to-point remote interface between each core and the next cache layer cache controller. Embodiments prohibit cache line duplicates between private L1 read/write caches but provide the remote interconnection bus 134 to each core in the computer system to read or write any cache line already populated in any other L1 cache. Embodiments implement an ownership-based cache coherency mechanism with ownership tables (using OTMs) maintained at the next higher layer in the cache hierarchy (L2 in FIGS. 1-3) to locate cache lines stored in all L1 cache banks.

The point-to-point bus configuration allows embodiments to scale to a potentially large number of cores in a system. In some configurations this allows for the use of a three step protocol to complete a L1 cache miss request with a remote cache hit response. The first step indicates a local cache miss in a core where the core of the L1 cache makes a request to the L2 cache controller 120. The second step indicates a remote cache hit where the L2 cache controller 120 makes a request to the L1 cache of another core that presently owns the cache line. The third step indicates the cache line response where the L2 cache controller responds to the requesting core that experienced the cache miss.

In embodiments including a small system with a limited number of cores, remote responses may be broadcast back between L1 read/write caches directly. This mitigates or removes the need for the third transaction and allows the original core to access the cache line data sooner.

In embodiment using a two-layer cache architecture, when the L2 cache controller 120 detects a L1 remote hit, the cache controller 120 forwards to the core owning the requested cache line the request received from the requesting core.

In embodiments, a core #102 is not aware of the cache lines owned by other cores 108. On a L1 cache miss, the core request, in addition to the cache line memory address, also indicates if the request is a read request or a write request. On write request, the write data and associated byte enables (if the data to be written is less than the cache line data width) are provided. Therefore, with its L1 cache miss request to the L2 cache controller, the requesting core #102 includes all pertinent information to remotely perform the data read or write operation. Table 1 illustrates the interface and signals used by a core #102 to access the L2 cache controller 120 through interface 128 (in the case of core #0 102).

TABLE 1

| input  | logic | i_L1toL1_reqrdy       |
|--------|-------|-----------------------|
| output | logic | o_L1toL2_req_vld      |
| output | logic | o_L1toL2_req_id       |
| output | logic | o_L1toL2_req_rlw0     |
| output | logic | o_L1toL2_req_am0_id   |
| output | logic | o_L1toL2_req_amo      |
| output | logic | o_L1toL2_req_addr     |
| output | logic | o_L1toL2_req_be       |
| output | logic | o_L1toL2_req_wdata    |
| output | logic | o_L1toL2_req_type     |
| //     |       |                       |
| input  | logic | i_L2toL1_rsp_vld      |
| input  | logic | i_L2toL1_rsp_id       |
| input  | logic | i_L2toL1_rsp_rdata    |
| input  | logic | i_L2toL1_rsp_amo_fail |
| input  | logic | i_L2toL1_rsp_type     |

The local cache interface supports unidirectional request and response transactions. In Table 1, above, inputs are signals sent by the L2 cache controller and received by a core #102 (L2toL1) while outputs are signals sent by a core #102 to the L2 cache controller (L1toL2). A request ID is included in the requests (o_L1toL2_req_id) and in the response (i_L2toL1_rsp_id) to allow the core #102 to associate a response to the request when multiple requests are issued, and responses are returned out of order. Request IDs may be used to recover specific information associated to responses received out of order. If responses are guaranteed to be returned in order, IDs are not required and can be generated from internal counters. Atomic memory operation (AMO) signals (o_L1toL2_req_amo, o_L1toL2_req_am0_id, and i_L2toL1_rsp_amo_fail) are optional fields and may be used to support atomic memory operations. The optional ready status (i_L2toL1_req_rdy) is provided to delay a response momentarily by creating back-pressure if responses cannot be handled in a timely manner. Side-band type signals may be used to communicate the type of requests (o_L1toL2_req_type) and responses (i_L2toL1_rsp_type). For example, a core #102 may use this interface preload its cache 106 using a different type of request than the type used for a local cache miss. Similarly, a cache controller 120 may use a particular response type to indicate to a core #102 if the associated response is a remote hit or a new cache line to add to its L1 cache 106 as an owner of the cache line.

In embodiments, power consumption may be reduced or minimized at the expense of longer delays required to complete remote accesses by configuring cores to only send the read/write request type, write data & enables signals once a remote hit is confirmed.

In embodiments, L2 cache controller 120 has a remote interface bus to each core in its cluster. Signal definitions of each core remote cache interface used by a cache controller 120 to access a cache 114 in a remote core #110 through interface 134 or 138, is shown in Table 2. In embodiments, L2 cache controller 120 would have a remote interface such as 134, to each core in the cluster or system:

TABLE 2

| input  | logic | i_rem_req_rdy      |
|--------|-------|--------------------|
| input  | logic | i_rem_req_id       |
| input  | logic | i_rem_req_rlw0     |
| input  | logic | i_rem_req_amo_id   |
| input  | logic | i_rem_req_amo      |
| input  | logic | i_rem_req_addr     |
| input  | logic | i_rem_req_be       |
| input  | logic | i_rem_req_wdata    |
| //     |       |                    |
| input  | logic | i_rem_rsp_rdy      |
| output | logic | o_rem_rsp_vld      |
| output | logic | o_rem_rsp_id       |
| output | logic | o_rem_rsp_rdata    |
| output | logic | o_rem_rsp_am0_fail |

In embodiments, the remote interface supports unidirectional request and response transactions. In Table 2, above, inputs are signals sent from an L2 cache controller and received by a core #110 while outputs are signals sent by a core #110 to be received by an L2 cache controller). A request ID (i_rem_req_id and o_rem_rsp_id) is provided to allow the cache controller 120 to associate a response back to a request when multiple requests are issued, and response are returned out-of-order. AMO signals (i_rem_req_amo, i_rem_req_amo_id, and i_rem_rsp_am0_fail) are optional and may be used to support atomic memory operations. The optional ready status (i_rem_req_rdy) is provided to delay a response momentarily by creating back-pressure if responses cannot be handled in a timely manner. If computer system 100 is configured with sufficient resources to avoid back-pressure, the ready signal is not required. Optional features may be omitted from the design of some embodiments, and included but declared optional in other embodiments.

Each core's private L1 cache 106 and 114 is responsible to service both local and remote cache access requests. Different algorithms can be provided to prioritize local request before remote or vice-versa. Internally, the core L1 cache module may treat local and remote access in the same way. When a core #110 receives and services a remote request from the L2 cache controller 120, the L1 cache TLM 202 is queried to locate the cache line in the L1 cache memory 114. On a remote write request, the "dirty" status of the cache line is set in the TLM to notify the cache line content has been modified (and a write-back to the main memory may be required on the cache line eviction). On a remote access, a cache line response is returned to the cache controller 120 to acknowledge the completion of the remote access. To end the transaction, the cache controller 120 returns to the requesting core #102 a remote hit status. In embodiments, a remote hit status may indicate to the core that the received cache line (from a remote read) is not to be added to the local L1 cache. On a remote write the returned data may be ignored, and the response with a hit status is interpreted the same way as a read, that is that no cache line to add, which helps to limit power consumption in the core.

The remote interface of embodiments provides a technical benefits of inhibiting cache line duplicates and the requirement for complex cache coherence management schemes by allowing any core to access cache lines in any other L1 caches. The remote interface provides all the necessary information to complete the access on a remote L1 cache hit. The point-to-point links between an L2 cache controller 120 and cores (and, if applicable, between an L3 cache controller 408 and clusters) of this computer system architecture allow systems to scale for a large number of cores in a cluster, while for smaller system other bus topologies such as a broadcast bus may be implemented.

In embodiments, ownership tables maintained in OTM at the next higher layer of the cache hierarchy, for example the L1 OTM 146 or 148, quickly and locally resolve a L1 cache miss. Ownership tables contain similar information to TLMs and store any required details (e.g., L1 cache tag, cache way, valid status, etc.) that may be required to locate a specific cache line in any of the memory of the cache layer below (for example, the L1 OTM 146 or 148 in the L2 cache controller 120). In embodiments, the use of cache way in the OTM is optional. On a hit in a remote core, the (remote) core owning the line can read its own L1 TLM to locate the line in its cache. By reading the TLM, the core finds which way is used to store that specific cache line. In cases where the cache way is kept in the OTM, it could be sent in the request from the L2 cache controller to the remote core to avoid the remote core reading its L1 TLM and accessing the cache immediately. Ownership tables are not necessarily required to track local cache updates that would require marking a cache line as "dirty" as a TLM would. The cache controller is able to determine where the cache line is stored in the computer system 100 with little to no additional overhead or communications with other modules. For example, a 32 KB L1 data cache with 512-bit (64 bytes) cache line and four-way associativity means that 512 cache lines can be stored in a L1 data cache organized with 128 sets, each set capable of holding 4 lines. If cache line addresses are 34-bit wide (total memory space of 16 GB), the address is divided in 3 segments: tag (bits 33:13), set (bits 12:6) and offset (bits 5:0). The 6-bit offset may be used to locate a specific byte in the 64-byte cache line. For a specific 7-bit set, the 21-bit tag is compared with the existing cache line tag in the L1 TLM for that set. On a match with one of the 4 tags in the set, a local cache hit is declared and the way (which of the 4 ways has a match) is used to locate the cache line in the cache memory. Other status bits such as valid, dirty, age are also maintained in the TLM for each cache line. The L2 cache controller 120 has a similar TLM structure organized with different tag and set widths (specific to the L2 cache size). In parallel to the L2 TLM 206, the cache controller 120 implements per-core ownership tables, for example L1 OTMs 146 and 148. The content of the L1 OTM tables is simpler than the L2 TLM 206 since the cache controller 120 is only required to know which core is the owner of a cache line. Once a core is confirmed as the cache line owner, the core L1 OTM 146 or 148 may be queried to locate the cache line in the core's L1 cache. A core OTM is indexed using the cache line address' set to confirm the ownership. Similarly to the TLM organization, the OTM stores up to four 21-bit tags per set plus a per-tag valid bit. By comparing the cache line tag against the 4 valid tags of the OTM set, the cache controller 120 obtains an indication as to whether or not the cache line is already present in a given L1 cache. Depending on the size of the cache and the width of the cache line, the OTM can be implemented using a memory or an array for registers. For example, a memory-based OTM to track a core's 32 KB L1 data cache using only tags and a valid bit would be 128 deep (# of sets) by 88 bits (4×(21-bit tag+1-bit valid status)). In embodiments when cache way is also included in an OTM, the width of the OTM would increase to accommodate the number of bits required to store the cache way.

The use of OTMs in embodiments can provide several technical benefits. The L2 cache controller 120 populates and maintains the per-core OTMs only using the core cache line request information. When a cache line is not owned by a core, cache line ownership may be granted to a core on a global miss, L2 cache miss, etc. and the cache line is fetched from the main memory. On a L1 cache line eviction, ownership is removed as the cache line is added to the L2 cache and made available to all cores in the system. On both occasions, the L2 cache controller uses the information provided by core on a L1 cache miss or L1 eviction requests.

Since the L2 cache controller queries the L1 OTMs and the L2 TLM in parallel, the remote hit, L2 hit or global miss status may in some embodiments be determined in one clock cycle, without additional signaling, synchronization or overhead to, from, or both to and from other modules within the multi-core system.

Figure 4:
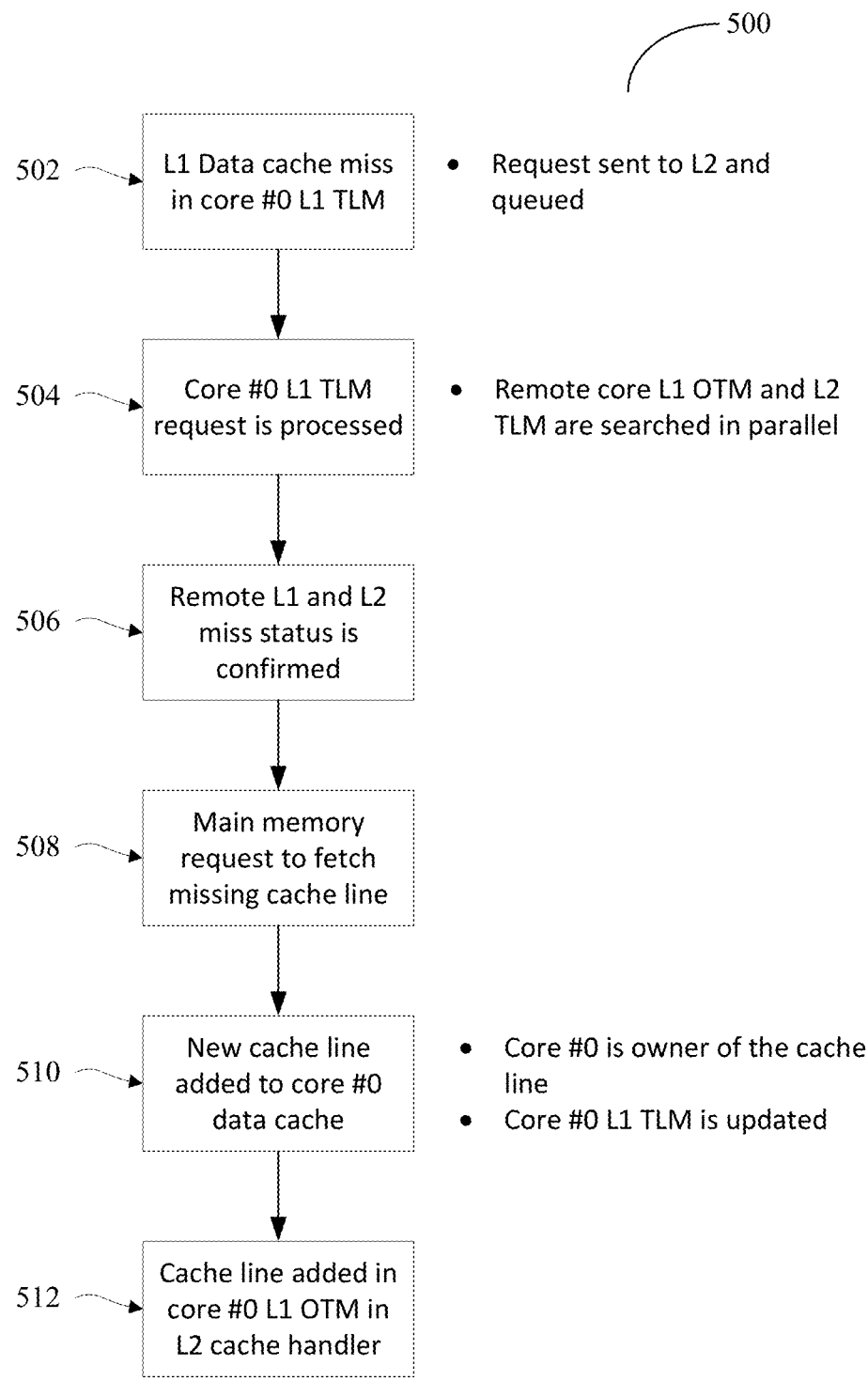
FIG. 4 illustrates a method performed on a global data cache miss, according to an embodiment.

FIG. 4 illustrates a method 500 performed on (i.e. in response to) a global data cache miss by the architecture of FIG. 2, according to an embodiment. In step 502, a core, such as core #0 102 tries to access a memory location and experiences a cache miss in its (core #0) TLM indicating that the cache line in not stored in its private L1 cache, for example L1 read/write cache 106. The request from core #0 102 may be a command such as a load, store, or instruction fetch, etc. Core #0 accesses its TLM based on the address of the memory location associated with the request. If the L1 TLM entry for the cache line indicates that the data is not cached (the cache way is empty, the valid bits of the cache way are cleared, or no valid cache tag match is found, etc.), a cache miss occurs. The L1 read/write cache 106 sends a request to the L2 cache controller 120 and the request is queued at the L2 cache controller 120. The request includes the memory address of the cache line that the miss occurred on, a request ID, and all the other information to complete the request remotely. An ID may be used to recover the specific information associated to responses received out-of-order. If responses are guaranteed to be returned in-order, IDs are not required and can be generated from internal counters. The request may also be marked as a "miss" using a side-band signal on the request interface. In step 504, L2 cache controller 120 processes the request from core #0 102 and searches the TLM of the L2 cache 206 and the OTM of the remote private L1 cache 114 of core #1 110 both of which may be searched in parallel. In step 506, it is confirmed that the access misses in both the L1 cache 114 of core #1 (and other remote cores) and in the L2 cache 122. In step 508, the cache line, or a larger cache line containing the L1 cache line, is fetched from main memory 124. In step 510, the new, retrieved cache line is sent to the private L1 read/write cache 106 of core #0 102. In step 512 an entry for the cache line is entered into the OTM 146 for core #0 102 in the L2 cache controller 120. The response with the cache line may be marked as a "miss" using a side-band signal on the response interface and may be used to indicate to core #0 102 that it is now the owner of the cache line. Core #0 becomes the owner of the cache line and core #0 updates its TLM tags with information that may include the cache tag of the new cache line and the cache way where the line is stored.

In embodiments, adding a new cache line to the private L1 read/write cache 106 when the cache set is already full, may require the eviction of a cache line from the cache 106. The new cache line's tag will overwrite the evicted cache line tag while the old cache line is moved out of the L1 read/write cache 106 memory and added to the shared L2 cache 122. The new cache line overwrites the old cache line data in the L1 read/write cache 106. An eviction request may be sent back from the core #0 to the L2 cache controller 120 to confirm the new cache line status. If the new cache line is added to the L1 read/write cache 106, the request may be used to indicate which way of the cache set is used by that line. Implicitly, core #0 is set as the new owner. If a cache line is evicted from the L1 read/write cache 106, the old cache line data and its dirty status is included in the eviction request. If a cache line request causes the global cache miss, the new cache line is returned back to the L2 cache controller 120. The L2 cache controller 120 receives the request on the eviction interface. If the eviction request contains an evicted old cache line from L1 read/write cache 106, or if the eviction request contains the new cache line following a flushed request by core, the line is added to the shared L2 cache 122 and its cache line tag to the L2 TLM 206 for that cache set. If the L1 read/write cache 106 evicted cache line is dirty, a write-through request may be automatically sent out to the main memory to update its data content at the cache line memory address. If the shared L2 cache 122 cache set is full (i.e., all ways used), a cache line is selected for eviction. Since a write-through mechanism is used, there is no need to update the main memory on shared L2 cache 122 eviction. In embodiments, a write-back mechanism could be used instead of a write-through mechanism. A simple acknowledge (ACK) may be sent back to core #0 102 to indicate that the eviction request has been serviced. This can indicate to the L1 cache that it can send another eviction request. For example, if the L2 cache queue is 4-deep, by using request ID 0 to 3 guarantees that the queue cannot overflow if response ACK with ID are sent back. The ACK can be used to indicate to the requestor that the queue can accept 1 more request.

Figure 5:
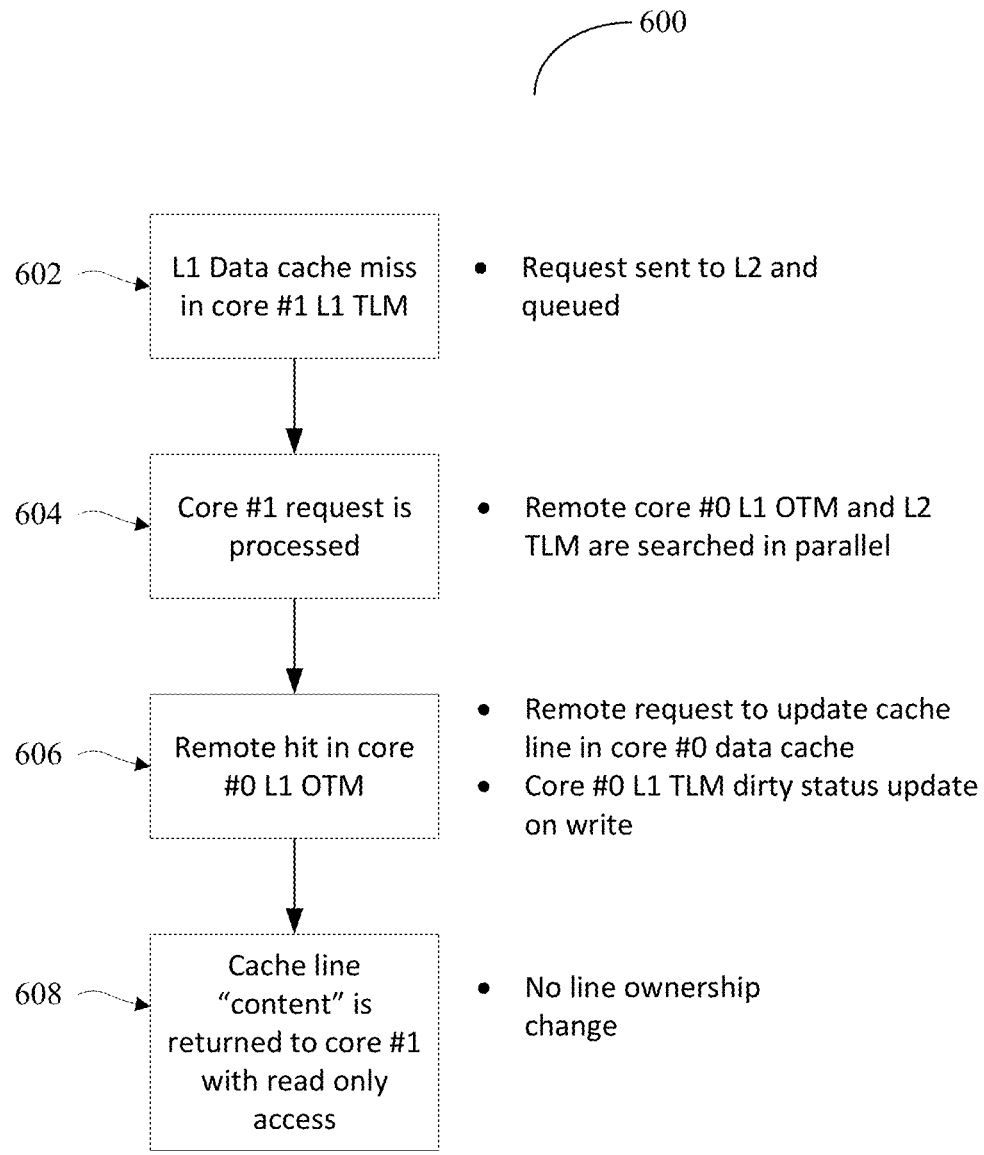
FIG. 5 illustrates a method performed on a layer 1 remote data cache hit, according to an embodiment.

FIG. 5 illustrates a method 600 performed on a remote data cache hit by the architecture of FIG. 2, according to an embodiment. In step 602, a core, such as core #1 110 tries to access a memory location and experiences a cache miss indicating that that cache line in not stored in its private L1 cache, for example L1 data cache 114. The L1 data cache 114 sends a request to the L2 cache's cache controller 120 and the request is queued at the L2 cache controller 120. In step 604, L2 cache controller 120 processes the request from core #1 110 and searches the OTM for the remote private L1 cache 106 of core #0 102 and the L2 TLM 206, both of which may be searched in parallel. The L2 cache controller 120 reads the L2 TLM 206 by using the cache set as the index (TLM's address) and compares valid cache tags against the cache tag included in the of the L1 data cache 114's request. If a valid cache tag match is not found, a L2 cache miss is declared in the shared L2 cache 122. The L2 cache controller 120 reads the OTM 146 ownership table of the other cores in the cluster and compared against all valid entries of the table for that cache set. When a valid cache tag match found, a L1 remote cache hit is detected. In step 606, a remote hit in private L1 cache 106 of core #0 102 occurs and it is confirmed that the data cache line is stored L1 cache 106 and is also owned by core #0 102. A remote request is made to access the line in the remote core #0 102 L1 read/write cache 106. The remote request is based on the original request generated by core #1 in step 602 and provides all the necessary information to complete the request remotely without additional communications between the cores. If the original memory access from core #1 110 was a write, the cache line is marked as "dirty" in the TLM of core #0 102 due to the modification (write) by core #1 110. If the memory access was a read operation (instruction load), the cache line is read and the cache line data is returned to the L2 cache controller 120. In step 608, the cache line content is returned to core #1 110. The response containing the cache line content may be marked as "hit" using a side-band signal on the response interface indicating to core #1 that the cache line was found remotely. The cache line is not cached in the L1 cache 114 for core #1 since it is not the owner of the cache line. The ownership of the cache line is not changed.

Figure 6:
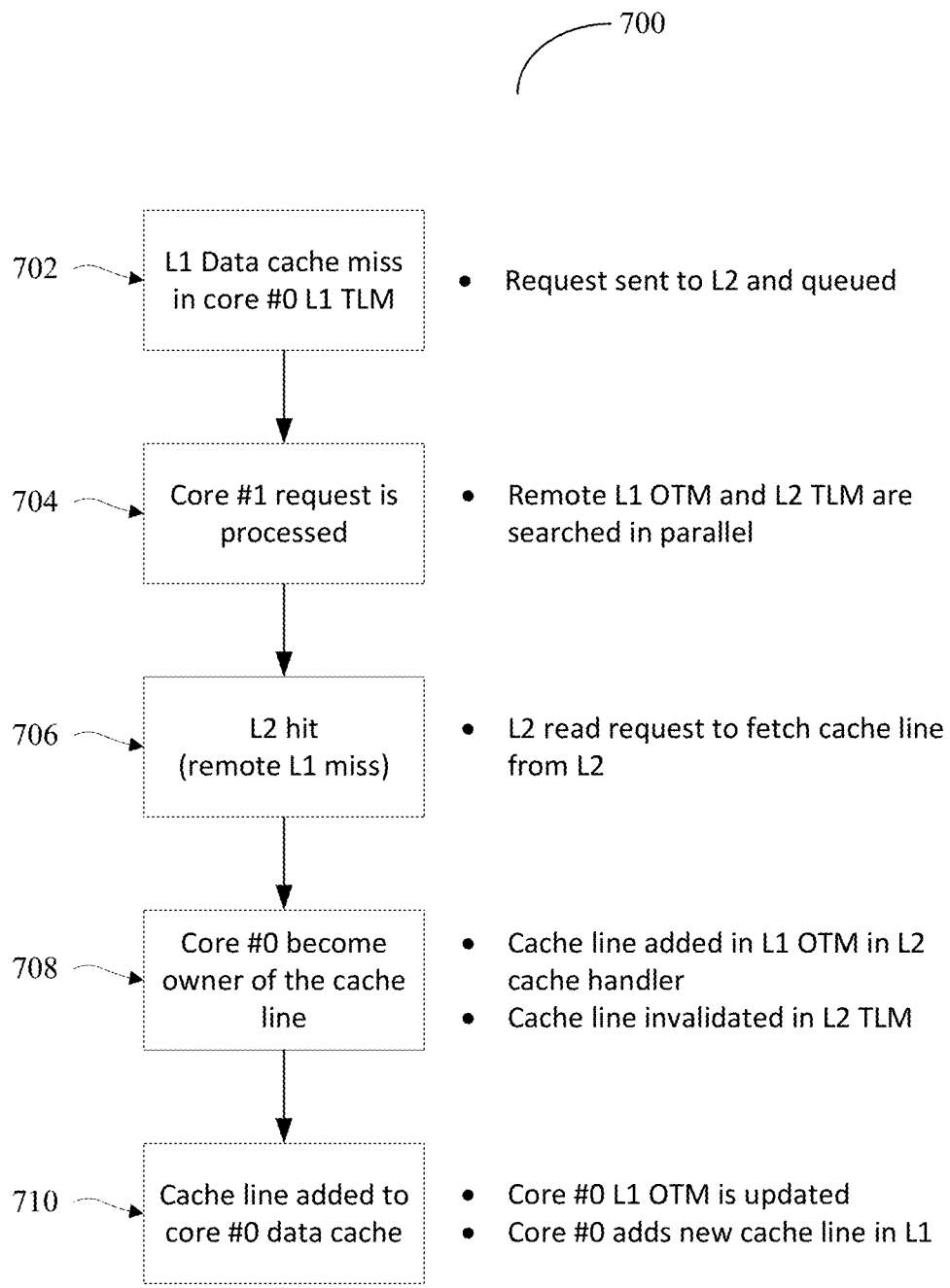
FIG. 6 illustrates a method performed on a layer 2 data cache hit, according to an embodiment.

FIG. 6 illustrates a method 700 performed on a layer 2 data cache hit by the architecture of FIG. 2, according to an embodiment. In step 702, a core, such as core #0 102 tries to access a memory location and experiences a cache miss indicating that that cache line in not stored in its private L1 read/write (data) cache 106. The L1 read/write cache 106 sends a request to the L2 cache's cache controller 120 and the request is queued at the L2 cache controller 120. In step 704, L2 cache controller 120 processes the request from core #0 102 and searches the OTM for the remote private L1 cache 114 of core #1 110 and the L2 TLM 206, both of which may be searched in parallel. In step 706, it is confirmed that there is a cache hit in the L2 cache 122 (and therefore a cache miss in the L1 cache 114 of core #1 and potentially other remote cores, clusters, or both). The cache line is fetched from the shared L2 cache 122. In step 708, core #0 102 becomes the owner of the cache line. The cache line is only cached in private L1 cache 106 and an entry for the cache line is entered into the L1 OTM 146 for core #0 102 in the L2 cache controller 120. In step 710, the cache line is added to the core #0 102 private L1 read/write cache 106. The TLM of core #0 is updated and the data is added to the read/write cache 106.

Figure 7:
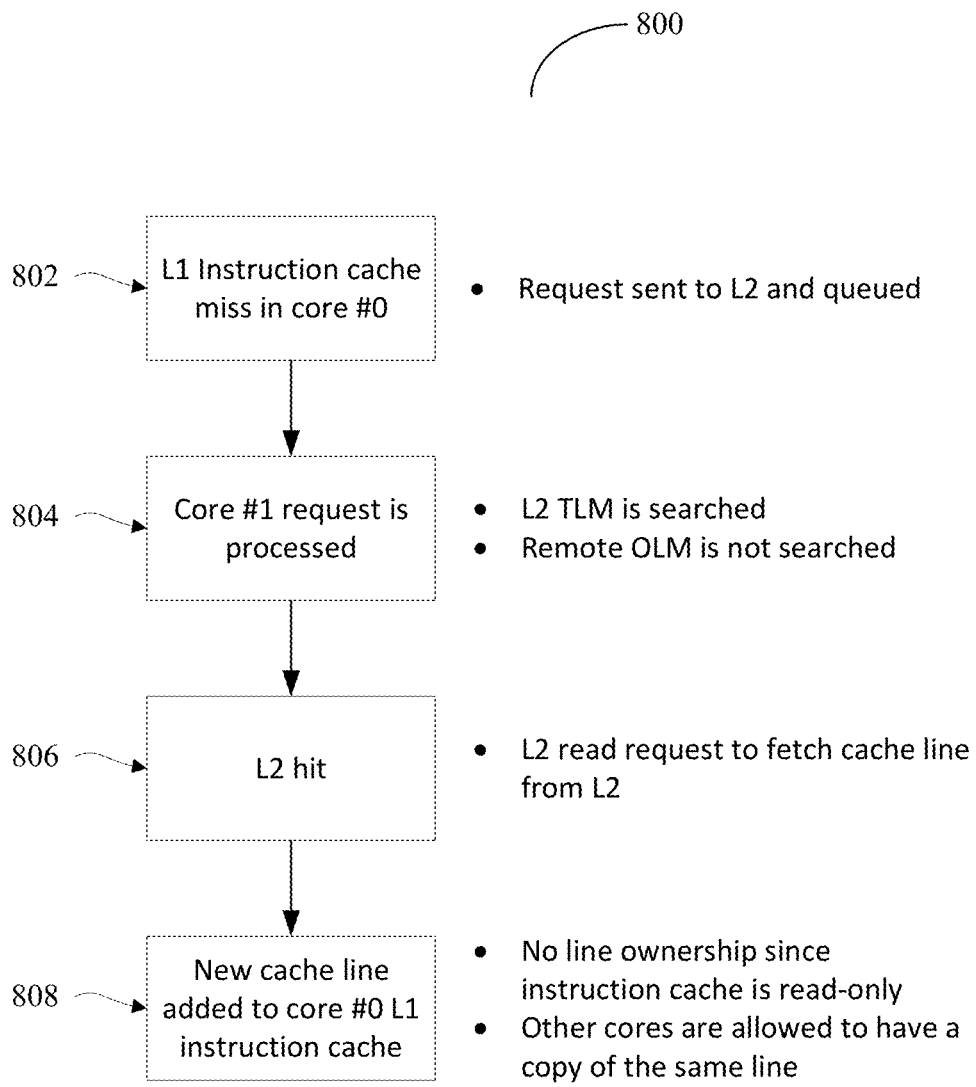
FIG. 7 illustrates a method performed on a layer 2 instruction cache hit, according to an embodiment.

FIG. 7 illustrates a method 800 performed on a layer 2 instruction cache hit, according to an embodiment by the architecture of FIG. 2 In step 802, a core, such as core #0 102 attempts to access a memory location and experiences a cache miss indicating that that cache line in not stored in its private L1 read-only (instruction) cache 104 which contains only read-only data. The L1 instruction cache 104 sends a request to the L2 cache controller 120 and the request is queued at the L2 cache controller 120. In step 804, L2 cache controller 120 processes the request from core #0 102 and searches the L2 TLM 206. Since instructions are read-only cache requests, OTM 148 of remote core #1 110 is not searched. In step 806, it is confirmed that there is a cache hit in the L2 cache 122 and the cache line is fetched from the shared L2 cache 122. In step 808, core #0 102 the cache line is added to core #0's 102 private L1 instruction cache 104. Since the cache line is read-only and may be present in multiple read-only caches simultaneously, no ownership is assigned to the cache line, and a copy of the instruction cache line may be kept in L2 in case another core's instruction cache also requests the same line. Other cores may also fetch and store the cache line in their local instruction caches.

Figure 8B:
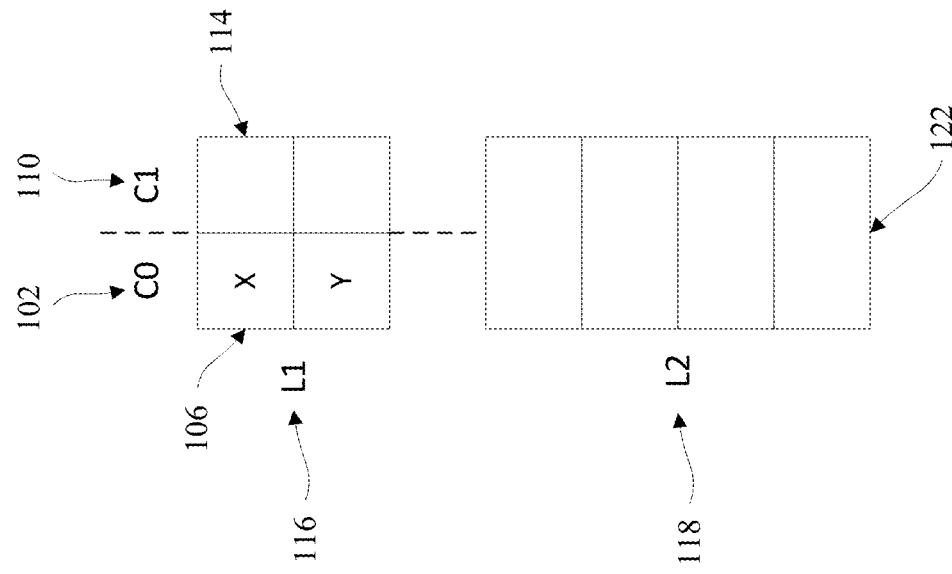
Figure 8A:
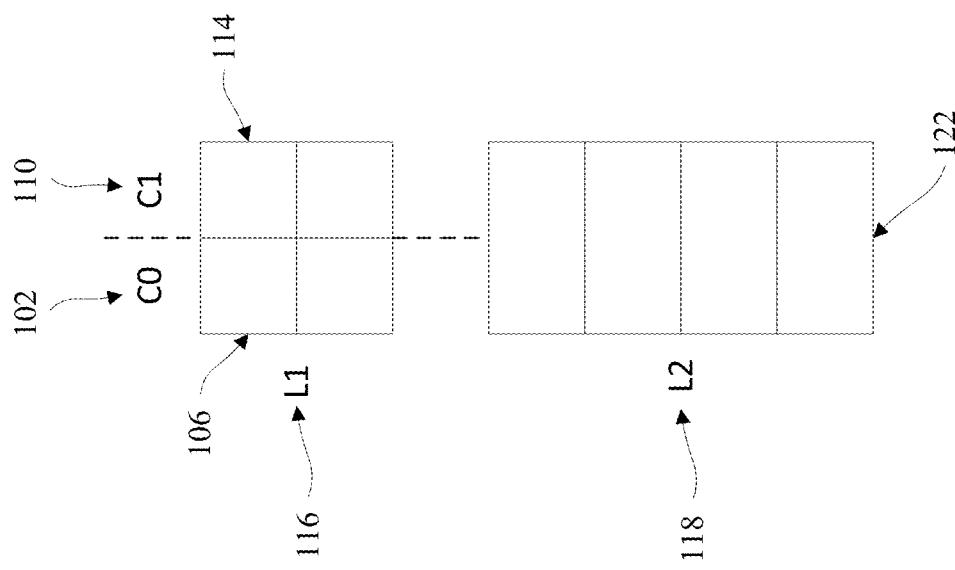
Figure 8D:
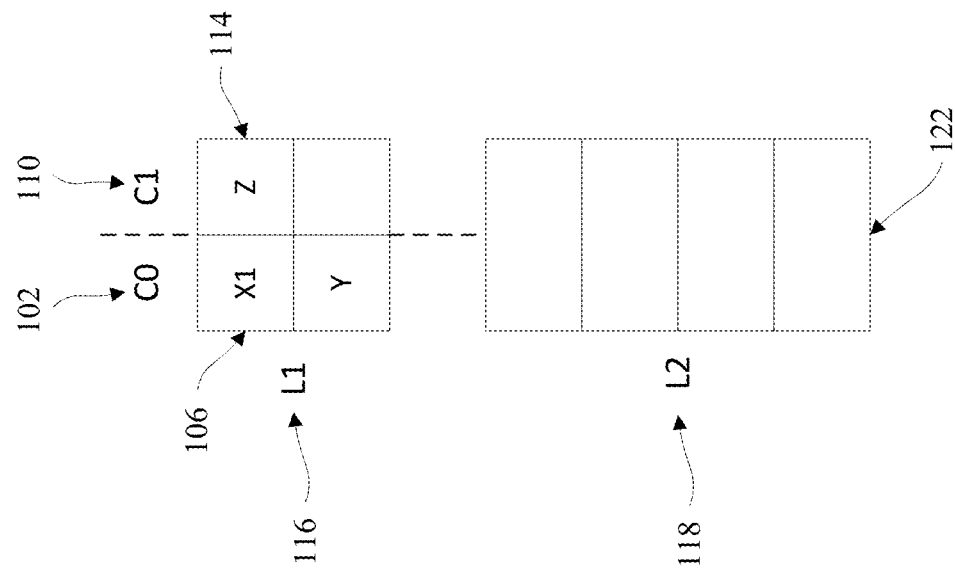
Figure 8C:
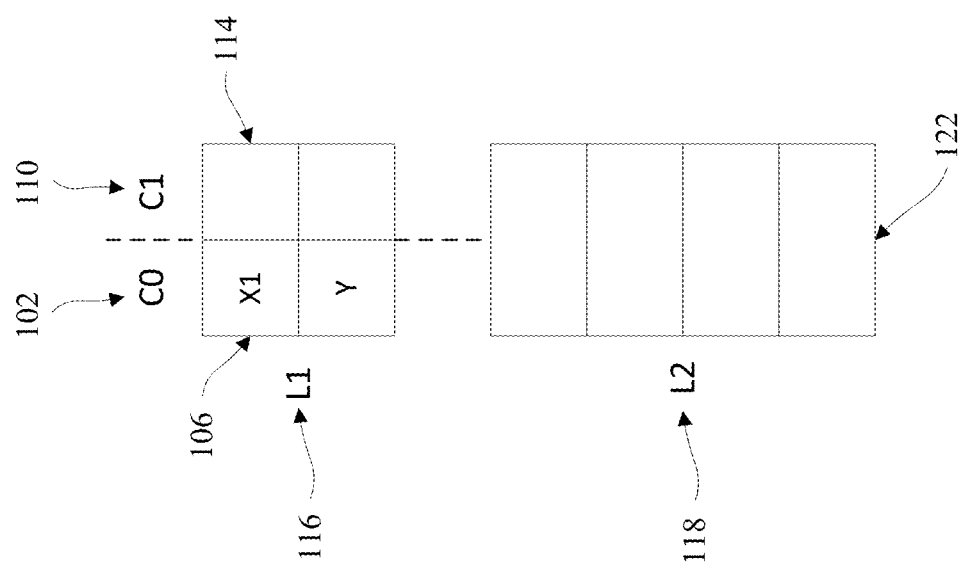
Figure 8I:
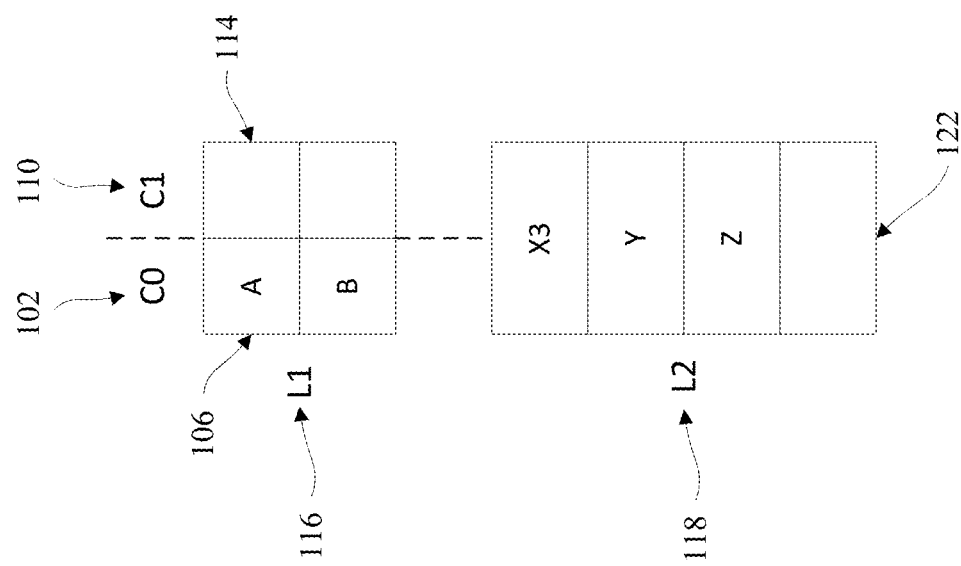

FIGS. 8A through 8I illustrate the operations of a cache hierarchy over the course of a number of operations, according to an embodiment. Core #0 includes private L1 read/write (data) cache 106. Core #1 110 includes private L1 read/write (data) cache 114. Layer 1 of the cache hierarchy 116 includes L1 read/write cache 106 and private L1 read/write cache 114. Layer 2 of the cache hierarchy 118 includes shared cache 122. With reference to FIG. 8A, in an initial state no data is cached. In FIG. 8B, core #0 102 attempts to access cache lines X and Y and the access misses in its empty L1 read/write cache 106. Cache lines X and Y are fetched from main memory and stored in L1 read/write cache 106. Core #0 becomes the owner of cache lines X and Y. In FIG. 8C, core #0 102 writes to cache line X. The write operation hits in L1 read/write cache 106 and X is updated to X1. In FIG. 8D, core #1 110 attempts to access cache line Z and the access misses in its empty L1 read/write cache 114. Cache line Z is fetched from main memory and stored in L1 read/write cache 114. Core #1 becomes the owner of cache line Z. In FIG. 8E, core #1 110 attempts to write to cache line X1 and the access misses in its L1 read/write cache 114. The write hits in remote private read/write cache 106 of core #0 102. Core #1 110 utilizes the protocols described herein it update cache line X1 to X2 in the L1 read/write cache 106 of core #0 102. Cache line X2 remains stored in L1 read/write cache 106 and core #0 102 remains the owner of cache line X2. FIG. 8F, core #0 102 tries to access cache lines A and B and the access misses in its L1 read/write cache 106 and in shared L2 cache 122. Cache lines A and B are fetched from main memory. Since L1 cache 106 is full due to X2 and Y already being cached, cache lines X2 and Y are evicted from L1 read/write cache 106 and cached in shared L2 cache 122. Cache lines X2 and Y are no longer owned by core #0 102 and are now cached in the L2 cache 120. Cache lines A and B can then be stored in L1 read/write cache 106 and core #0 102 becomes the owner of cache lines A and B. In FIG. 8G, core #1 110 attempts to access cache lines X2 and Y, stored in shared L2 cache 122. The access misses in the private L1 caches 106 and 114 of the L1 cache hierarchy 116 but hits in the shared L2 cache 122. Cache lines X2 and Y may be copied to L1 cache 114 which caused cache line Z to be evicted to L2 cache 120. Cache lines X2 and Y are invalidated in the L2 cache 122 since they are now owned by the L1 cache 114 of core #1 110. In FIG. 8H, core #0 102 attempts to write to cache line X2. The access misses in the private L1 cache 106 of core #0 102 and hits in the remote L1 cache 114 of core #1 114. Core #0 102 updates the value of X2 to X3 in the L1 cache 114 of core #1. Though X3 is now dirty in the L1 cache, the L2 cache controller may be unaware of this until X3 is evicted from the L1 cache. In FIG. 8I, core #1 110 evicts cache lines X3 and Y from its private L1 cache 114. X3 is used to update X2 to X3 in shared L2 cache 120. Ownership tags for cache lines X3 and Y are removed as they are no longer stored in any L1 cache.

Embodiments combine the technical features of shared and private L1 cache banks and mitigates or eliminates the need for complex cache coherence management systems. With small OTMs, no bus broadcast and point-to-point remote interfaces, the cache coherent architecture described herein may be scalable for up to a large number of cores in the system. This scheme limits or minimizes the coherence management overhead as little or no additional communications are required to populate the OTM. It may also significantly reduce the latency of cache line shared between cores since line duplicates are avoided and OTM quickly locates any cache lines available in the L1 cache banks. Since cache lines are not duplicates, storage efficiencies of the overall cache memory is improved.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

The invention claimed is:

1. An apparatus comprising:
   a first core including a first local cache;
   a second core including a second local cache at a same cache layer as the first local cache, the first core and the second core coupled through a remote link, the first local cache accessible to the second core via a remote interface and the second local cache accessible to the first core via the remote interface; and
   a shared cache coupled to the first core and to the second core, a cache controller of the shared cache including a first ownership table memory (OTM) of the first core and a second ownership table memory (OTM) of the second core, the first ownership table memory and the second ownership table memory including a plurality of entries indicating if a cache line is owned solely by the first core or if the cache line is owned solely by the second core, wherein the cache line may only be simultaneously cached in one of the first local cache, the second local cache, or the shared cache, the cache line being cached in the first local cache when the first core is the owner of the cache line, the cache line being cached in the second local cache when the second core is the owner of the cache line.

2. The apparatus of claim 1 wherein the remote link comprises a first link between the first core and the cache controller and a second link between the second core and the cache controller.

3. The apparatus of claim 1 wherein the shared cache further comprises tag lookup memory of the shared cache, the first local cache includes tag lookup memory for the first local cache, and the second local cache includes tag lookup memory for the second local cache.

4. The apparatus of claim 1 wherein the cache controller is configured to:
   receive, from the first core, a request for the cache line;
   search the second OTM for an owner of the cache line;
   retrieve the cache line from a location indicated by the second OTM; and
   send the cache line to the first core.

5. The apparatus of claim 1 wherein the cache controller is further configured to search a tag lookup memory for a status of the cache line in the shared cache.

6. The apparatus of claim 1 wherein the search of the second OTM indicates that the cache line is not cached, and the cache line is located in a main memory, the cache controller being further configured to update the first OTM to indicate that the first core is the owner of the cache line.

7. The apparatus of claim 1 wherein the search of the second OTM indicates that the cache line is cached in the second core, the owner of the cache line is the second core, and the cache line is located in the second local cache of the second core, the cache controller being further configured to receive the cache line from the second core.

8. The apparatus of claim 1 wherein the search of the second OTM indicates that the cache line is cached in the shared cache, and the location is the shared cache, the cache controller being further configured to update the first OTM to indicate that the first core is the owner of the cache line.

9. A method for accessing data in a remote cache of a computer system, by a cache controller of a shared cache, the method comprising:
   receiving, from a first core of the computer system, a request for a cache line;
   searching an ownership table memory (OTM) for an owner of the cache line, the owner being one of a plurality of cores of the computer system, the OTM being associated with a second core of the computer system;

retrieving the cache line from a location indicated by the OTM;

sending the cache line to the first core; and wherein the first core includes a first local cache, a second core includes a second local cache at a same cache layer as the first local cache, the first core and the second core are coupled through a remote link, and the shared cache is coupled to the first core and to the second core, the cache controller of the shared cache includes a first OTM of the first core and a second OTM of the second core, the first OTM and the second OTM including a plurality of entries indicating if the cache line is owned solely by the first core or if the cache line is owned solely by the second core, wherein the cache line may only be simultaneously cached in one of the first local cache, the second local cache, or the shared cache, the cache line being cached in the first local cache when the first core is the owner of the cache line, the cache line being cached in the second local cache when the second core is the owner of the cache line.

10. The method of claim 9 further comprising searching a tag lookup memory for a status of the cache line in the shared cache.

11. The method of claim 9 wherein the search of the OTM indicates that the cache line is not cached, and the cache line is located in a main memory, the method further comprising updating the OTM to indicate that the first core is the owner of the cache line.

12. The method of claim 9 wherein the search of the OTM indicates that the cache line is cached in the second core, the owner of the cache line is the second core, and the cache line is located in the second local cache of the second core, the method further comprising the cache controller receiving the cache line from the second core.

13. The method of claim 9 wherein the search of the OTM indicates that the cache line is cached in the shared cache, and the location is the shared cache, the method further comprising updating the OTM to indicate that the first core is the owner of the cache line.

14. The method of claim 9 wherein the remote link comprises a first link between the first core and the cache controller and a second link between the second core and the cache controller.

15. The method of claim 9 wherein the shared cache further comprises tag lookup memory of the shared cache, the first local cache includes tag lookup memory for the first local cache, and the second local cache includes tag lookup memory for the second local cache.

* * * * *